(12) United States Patent
Johnson et al.

(10) Patent No.: US 12,708,499 B2
(45) Date of Patent: Aug. 18, 2026

(54) WEAR-OUT DETECTION FOR AN ORAL CARE SYSTEM

(71) Applicant: KONINKLIJKE PHILIPS N.V., Eindhoven (NL)

(72) Inventors: Mark Thomas Johnson, Arendonk (BE); Lutz Christian Gerhardt, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 366 days.

(21) Appl. No.: 18/037,816

(22) PCT Filed: Nov. 16, 2021

(86) PCT No.: PCT/EP2021/081776
§ 371 (c)(1),
(2) Date: May 19, 2023

(87) PCT Pub. No.: WO2022/106386
PCT Pub. Date: May 27, 2022

(65) Prior Publication Data

US 2024/0293211 A1 Sep. 5, 2024

(30) Foreign Application Priority Data

Nov. 19, 2020 (EP) .................................... 20208675
Jun. 21, 2021 (EP) .................................... 21180705

(51) Int. Cl.
*A61C 17/22* (2006.01)
*A46B 15/00* (2006.01)
*A61C 17/34* (2006.01)

(52) U.S. Cl.
CPC ........... *A61C 17/221* (2013.01); *A46B 15/00* (2013.01); *A61C 17/34* (2013.01)

(58) Field of Classification Search
CPC ......... A46B 13/02; A46B 15/00; A61C 17/22; A61C 17/34
See application file for complete search history.

(56) References Cited

U.S. PATENT DOCUMENTS 6,536,068 B1 3/2003 Yang et al.
9,668,842 B2 * 6/2017 Spruit ................. A61B 5/6891
(Continued)

FOREIGN PATENT DOCUMENTS

CN 104869891 A 8/2015
CN 105050488 A 11/2015
(Continued)

OTHER PUBLICATIONS

International Search Report and Written Opinion Dated Apr. 12, 2022 For International Application No. PCT/EP2021/081776 Filed Nov. 16, 2021.

*Primary Examiner* — Michael D Jennings

(57) ABSTRACT

A wear-out assessment for an oral care system (14) (e.g. an oral cleaning device) is disclosed. A sensor unit (16) of the oral care system is adapted to provide a sensor signal related to a cleaning efficacy of a cleaning function of the oral care system when generated when the oral care system is inside a user's mouth. The sensor unit (16) may be, or may be coupled to, a component which is used during execution of an oral care function of the device, for example a sensor for detecting cleaning progress in the mouth, or a component which drives a cleaning or treatment action in the mouth. In accordance with the invention, the sensor signal (20) generated when the oral care system is outside the mouth is used for performing a wear-out assessment. As relevant components used by the oral care system (14) for the oral care function wear, characteristics of the sensor signal (20) may
(Continued)

change in a predictable way, which can be used to identify when a wear-out state has been reached.

10 Claims, 3 Drawing Sheets

(56) References Cited

U.S. PATENT DOCUMENTS

| | | | | |
|---|---|---|---|---|
| 2008/0256725 | A1 | 10/2008 | Emge | |
| 2008/0295760 | A1 | 12/2008 | Wielstra | |
| 2012/0021375 | A1 | 1/2012 | Binner et al. | |
| 2012/0171657 | A1* | 7/2012 | Ortins | A61C 17/221 434/365 |
| 2017/0091938 | A1* | 3/2017 | Noll | A46B 5/0095 |
| 2018/0137774 | A1* | 5/2018 | Gatzemeyer | A46B 15/0008 |
| 2020/0260859 | A1* | 8/2020 | Deane | A46B 15/0012 |

FOREIGN PATENT DOCUMENTS

| | | | |
|---|---|---|---|
| CN | 106510881 | A | 3/2017 |
| CN | 106510881 | B | 5/2018 |
| CN | 108366669 | A | 8/2018 |
| KR | 20180046516 | A | 5/2018 |
| WO | 2014097008 | A1 | 6/2014 |
| WO | 2014097031 | A1 | 6/2014 |
| WO | 2014097045 | A1 | 6/2014 |
| WO | 2014097135 | A1 | 6/2014 |
| WO | 2014097198 | A1 | 6/2014 |
| WO | 2014097240 | A2 | 6/2014 |
| WO | 2014097241 | A1 | 6/2014 |
| WO | 2015056197 | A1 | 4/2015 |
| WO | 2018100121 | A1 | 6/2018 |
| WO | 2018160986 | A1 | 9/2018 |
| WO | 2020123992 | A1 | 6/2020 |

* cited by examiner 62
58
56

58
56

58
56

66
56
50
Detector
54
52
Flow generator 72
68a
68b
74
56
51
50
Sensor 68a
72
68b
74
82
82
82
84
80
Optical Sensor 66
56

66
56

Signal
92
94
time
(a)
Signal
92
100
94
time
(b)

WEAR-OUT DETECTION FOR AN ORAL CARE SYSTEM

This application is the U.S. National Phase application under 35 U.S.C. § 371 of International Application No. PCT/EP2021/081776, filed on Nov. 16, 2021, which claims the benefit of EP 20208675.7 filed Nov. 19, 2020 and EP 21180705.2 filed Jun. 21, 2021. These applications are hereby incorporated by reference herein.

FIELD OF THE INVENTION

This invention relates to detection of wear-out of components of an oral care system.

BACKGROUND OF THE INVENTION

CN106510881A discloses an indication method for judging whether a brush head needs to be replaced or not according to the actual tooth-brushing usage situation of a user. The indication method comprises the steps of obtaining tooth-brushing data of the user, working out the loss value of the brush head according to the tooth-brushing data of the user, and sending the indication that the brush head needs to be replaced to the user when the loss value of the brush head is larger than or equal to a predefined threshold.

Within the field of oral care devices, it is valuable to be able to detect wear-out of relevant operative components of the device, which causes reduction of the efficacy of the oral care function. By way of example, for oral cleaning devices, cleaning efficacy can diminish in time. This can be caused by physical wear, deformation or degradation of cleaning elements such as bristles, e.g. in toothbrushes. Other types of oral care device however include, by way of non-limiting example, powered flossing devices, oral irrigators, oral treatment devices employing use of electromagnetic (EM) energy, such as radio frequency emissions or light, or a combination of these devices. Each of these units also include components which are used in the administration of the oral care function and which can wear over time, e.g. mechanical cleaning elements such as bristles, nozzles, applicators, reflectors, or radiation output surfaces.

One developing class of oral care device is that of mouthpiece units. These typically have an arcuate (e.g. U-shaped) structure with upper and lower tooth-receiving channels, and typically include curved rows of bristles which follow the shape of the tooth-receiving channels. These allow rapid and thorough cleaning of teeth with reduced effort for the user.

As the mouthpiece wears, performance will reduce and it is advantageous to have functionality for automatically advising a user when the whole mouthpiece, or a particular component of it (e.g. brushing section) should be replaced.

The same problem also arises in the field of toothbrushes and is mainly characterized by bristle splaying.

Developments in the field of wear-out detection for oral care devices are generally sought.

SUMMARY OF THE INVENTION

The invention is defined by the independent claims. The dependent claims define advantageous embodiments.

According to examples in accordance with an aspect of the invention, there is provided an oral care system comprising:

- a sensor unit adapted to generate an output signal related to or indicative of a cleaning efficacy of an oral cleaning function of the system; and
- a processor arranged to:
  - receive the output signal from the sensor unit;
  - determine one or more pre-defined characteristics of the signal, and
  - perform a wear-out assessment comprising determining whether the one or more signal characteristics meet one or more pre-defined criteria, and generating a wear-out feedback signal dependent upon an outcome of the assessment.

Embodiments of the invention are based on determining wear-out based on utilizing an output of a sensor unit or module which is arranged to provide a direct or indirect indication of a cleaning efficacy of cleaning mechanisms of the oral care system. This could for example be a clean-level sensor, or a module which detects operation characteristics of a cleaning mechanism of the device (e.g. drive signal characteristics of an oscillatory movement generator). The sensor may determine a cleanliness level or a (time) derivative thereof, e.g. a cleanliness rate.

The wear-out feedback signal is a wear-out indicator signal indicative of wear of the cleaning elements (e.g. bristles) exceeding a certain threshold.

A group of embodiments is based on the concept of indirectly detecting a physical degradation of certain oral care components of the system based on longer-term drifting of certain characteristics of the sensor unit output signal as measured during a time when the device is not being operated for an oral care function (i.e. characteristics of a null signal or calibration signal).

By way of example, the wear-out assessment may comprise retrieving from a memory one or more baseline measures of the one or more pre-defined characteristics of the signal, and detecting deviation of the determined characteristics of the sensor unit output signal from the baseline measures of the characteristics of the signal.

For example, the one or more pre-defined criteria applied in the wear-out assessment may comprise a threshold or minimum deviation of the defined signal characteristics from the reference or baseline characteristics.

The determining may be done outside of an operation session of the oral care system, i.e. when components of the oral care system are not physically interacting with oral surfaces. The output signal thus corresponds for example to a calibration signal or null signal.

The baseline characteristics may refer to a specific set of one or more characteristics of the output signal measured at a point of minimum or zero wear of the device components. The characteristics are chosen as ones which change progressively as a function of increasing wear of relevant oral care device components, e.g. cleaning elements.

By way of one example, as bristles of an oral cleaning device such as a mouthpiece cleaning device, begin to splay with wear, they can physically interfere with the operation of a physical sensor. For example, bristles can splay into or bend away from the emission path of a clean-level sensor which uses a fluid, electromagnetic (e.g. optical) or acoustic emission. This will change the signal characteristics.

In accordance with one or more embodiments, the sensor unit may be adapted to generate an electromagnetic (e.g. optical), acoustic or fluid emission for performing a contact or non-contact physical interaction with surfaces in an oral cavity of a user, and wherein the output signal is dependent upon properties of the interaction of said emission with surfaces in the oral cavity, e.g. tooth, gum or any other (biological) material surface.

In this set of embodiments, the sensor unit could, by way of one example, be a sensor for detecting a cleanliness level of teeth.

The output signal may be based on measurement of one or more detected physical properties of the emission after or during physical interaction with an oral surface.

The output signal might for example give an indication of interaction of the emission with cleaning elements en route to the tooth surfaces.

In a further set of examples, the sensor unit may include, or be electrically coupled to, one or more operative components of the oral care device which are already adapted to perform an oral care function, e.g. a movement generator which drives oscillatory motion of cleaning elements.

In accordance with one or more embodiments, the sensor unit may comprise a clean-level sensor adapted to perform a contact or non-contact physical interaction with oral surfaces to detect a level of cleanliness of tooth surfaces, and wherein the output signal is indicative of a clean level.

The output signal in this case may be an output signal generated by the sensor.

If certain characteristics of the clean level sensor signal change from reference values, this might give an indication of physical interference between of the emission of the clean level sensor and physical elements of the device en route to the tooth surfaces.

In some examples, the clean-level sensor may be a plaque-detection sensor.

In accordance with one or more embodiments, the clean-level sensor is a plaque detection sensor adapted to generate a fluid flow for being driven onto or over a tooth surface, and wherein the output signal is based on measurement of a pressure or flow of the generated fluid flow.

The pressure or flow of the fluid (e.g. air) when it is being driven in a stream onto or over the tooth surface provides an indication of plaque level, since with increasing level of tooth cleanliness, the pressure of the fluid flow increases. In particular, (sticky) plaque tends to provide some elastic absorption of the applied fluid pressure. As the tooth surface becomes cleaner, it becomes harder, meaning that measured fluid back-pressure increases. Thus, the pressure of the fluid flow provides an inverse measure of a clean level of tooth surfaces.

In accordance with one or more embodiments, the oral care system may comprise mechanical cleaning elements for mechanical engagement with surfaces in the oral cavity. The oral care system may further comprise a movement generator arranged to drive oscillatory movement of the cleaning elements during an operation session. The movement generator may comprise a motor powered by a drive circuit. The sensor unit in this case may be provided coupled to the drive circuit, and wherein the output signal is indicative of one or more electrical characteristics of the drive circuit.

Properties such as current or voltage of the drive circuit may fluctuate during operation of the device for cleaning the teeth. However, as a clean level increases, these properties may stabilize. This stabilization thus gives an indication of clean level. Thus, the output signal of the sensor unit, coupled to the drive circuit, is related to or indicative of cleaning efficacy.

In accordance with one or more embodiments, determination of the one or more signal characteristics may be done during or after each operation session, and wherein the wear-out assessment is based on the signal characteristics detected over a plurality of operation sessions.

For example, it may be based on an average of the one or more signal characteristics over multiple sessions, for example an average of a defined number of most recent operation sessions, or an average over a defined recent time period (e.g. average over one week).

The determination may be performed every operation session, and its results stored in a local or remote memory. The determination may be further utilized in some examples to provide an end-of-cleaning indicator, indicating that the mouth is sufficiently clean, and the cleaning session can end. This may be used to generate a sensory feedback output to a user, or may be used to automatically cease an active cleaning operation of the device, e.g. to deactivate oscillation of cleaning elements of the device.

The wear out assessment may be performed automatically after or during every operation session, or it may be done less frequently, for example every week, or every two days.

In accordance with one or more embodiments, the oral care system may comprise an oral care device including at least a portion for being received in an oral cavity of a user, and wherein the oral care device comprises the sensor unit.

The processor may be comprised by the oral care device, so that the two form a single unit. Alternatively, the processor may be external to the oral care device, for example it may be a processor of a mobile computing device belonging to the user, and adapted to operatively communicate with the oral care device.

In accordance with one or more embodiments, the oral care device may comprise a mouthpiece unit for being received in the oral cavity of a user. The mouthpiece unit may be U-shaped and may include upper and lower tooth-receiving channels, with a biting surface disposed between the two channels, forming a base for each of the channels.

The mouthpiece unit may comprise a plurality of cleaning elements protruding into the tooth-receiving channels for mechanical engagement with tooth surfaces during an operation session. The cleaning elements may comprise cleaning filaments. The cleaning elements may be bristles or bristle bundles, or any other mechanical element being able to exert forces onto oral surfaces.

Examples in accordance with a further aspect of the invention provide a method for detecting wear-out in an oral care device. The method comprises receiving an output signal from a sensor unit, the sensor unit adapted in use to generate an output signal related to or indicative of a cleaning efficacy of an oral cleaning function of the system. The method further comprises determining one or more pre-defined characteristics of the signal. The method further comprises performing a wear-out assessment comprising determining whether the one or more signal characteristics meet one or more pre-defined criteria, and generating a wear-out feedback signal dependent upon an outcome of the assessment.

Examples in accordance with a further aspect of the invention provide a computer program product comprising computer program code, the computer program code being executable on a processor, and the code configured to cause the processor to perform a method in accordance with any example or embodiment outlined above or described below, or in accordance with any claim of this application.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying schematic drawings, in which.

DETAILED DESCRIPTION OF THE EMBODIMENTS

Figure 1:
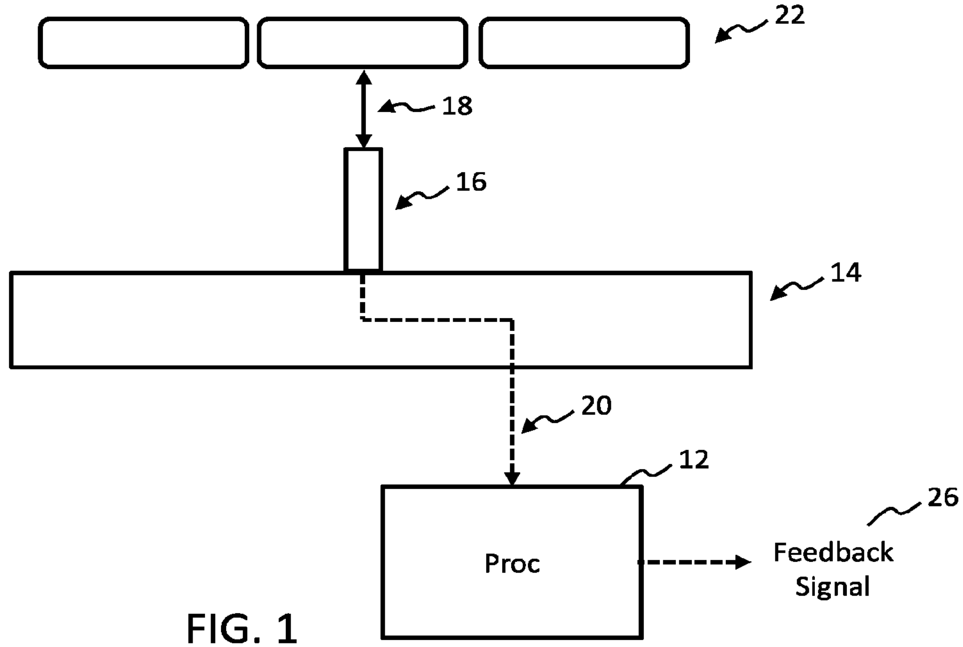
FIG. 1 outlines components of an example system including a processor in accordance with one or more embodiments of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method and processor for performing a wear-out assessment for an oral care device (e.g. an oral cleaning device). An output signal is received from a sensor unit of the oral care device which, in operation, is adapted to provide an output related to a cleaning efficacy of a cleaning function of the oral care device. The sensor unit may be, or may be coupled to, a component which is used during execution of an oral care function of the device, for example a sensor for detecting cleaning progress in the mouth, or a component which drives a cleaning or treatment action in the mouth. The signal is used for performing a wear-out assessment. As relevant components used by the device for the oral care function wear, characteristics of the signal may change in a predictable way, this can be used to identify when a wear-out state has been reached.

The output signal of the sensor unit may in some examples be based on properties of a functional component which is comprised by the oral care device, and active during operation for oral care. It is anticipated that the functional component may be a component which is used as part of the normal oral care operation of the oral care device. Most oral care devices include at least one component which performs contact or non-contact physical interaction with dental or other oral surfaces. It is one realization of the inventors that characteristics of a signal representative of this physical interaction can usefully be utilized for a secondary purpose of determining wear-out of components of the device. For example, wear-out can be detected of cleaning elements of the device in the case that the device is an oral cleaning device. Cleaning elements may for example include filaments or protrusions designed to rub against tooth surfaces for a cleaning function. However, in other examples, wear-out may be wear-out of other components. In general, wear-out results in diminution of the efficacy of the oral care function being provided by the device, e.g. diminished cleaning efficacy arising from for example mechanical deformation, splaying, abrasion, degradation of cleaning elements.

Embodiments of the invention are applicable to a range of different oral care devices, which may be adapted to perform for example oral cleaning and/or treatment functions.

One emerging class of oral care device is that of automatic tooth brushing mouthpieces. These comprise a U-shaped cleaning portion which comprises cleaning elements such as bristles and is arranged to be received in the mouth, with upper and lower rows of teeth received within upper and lower tooth receiving channels, and with bristles projecting into the channels to provide a brushing function. This provides faster brushing times and greater ease-of-use for a user.

FIG. 1 schematically depicts the basic components of an example oral care system as may be provided according to one aspect of the invention. The system includes a processor 12 which is arranged to receive a signal 20 from a sensor unit 16, the sensor unit being comprised by the oral care device 14.

A further aspect of the invention provides the processor 12 alone. The processor may for example include a communication module or input/output adapted to connect in operation to the sensor unit 16 to receive the signal 20.

A further aspect of the invention may provide an oral care system comprising the oral care device 14 (with sensor unit) and the processor 12 operatively coupled in operation to the sensor unit 16.

The processor 12 is adapted to determine one or more pre-defined characteristics of the output signal 20, and perform a wear-out assessment comprising determining whether the one or more signal characteristics meet one or more pre-defined criteria. The processor is further adapted to generate a wear-out feedback signal 26 dependent upon an outcome of the assessment. For example, the processor may generate the feedback signal only in the case of a positive outcome of the wear-out assessment (i.e. in the case that wear-out has been detected).

The sensor unit 16 may in some cases be adapted during operation to perform a contact or non-contact physical interaction 18 with surfaces of teeth 22 in an oral cavity of a user (e.g. as illustrated in FIG. 1). The sensor unit may in some further cases be signally coupled to a functional component which performs such a contact or non-contact physical interaction 18 with surfaces of teeth 22. The output signal 20 may in some examples be dependent upon properties of the physical interaction. These represent example options only and other configurations are possible.

Examples of a non-contact physical interaction might be for example use of acoustic or electromagnetic waves or emissions emitted from a sensor unit, and wherein reflections thereof are detected by the sensor unit. Examples of a contact physical interaction might be for example a piezoelectric sensor integrated at the distal end of a cleaning element which is arranged to be rubbed against the surface of the teeth, where the piezoelectric sensor comes into direct contact with the teeth. Another example of a contact physical interaction may be a drivetrain mechanism which drives physical movement of cleaning elements against surfaces of teeth, or a fluid sensor to detect plaque. The output signal may be an electrical characteristic of the actuator drive circuit, which may fluctuate depending upon properties of the interaction between the cleaning elements and the teeth surfaces.

Reference in this disclosure to an operation session may correspond to a period in which the oral care device is operating in a cleaning or treatment mode. It may correspond to a time when operative or functional components are active for performing an oral care function. For example, it may correspond to a time at which a movement generator is driving oscillation of cleaning elements of the oral care device.

The feedback signal 26 may be a sensory output signal, for example a control signal for controlling a sensory output device to generate sensory stimulus for communicating a positive outcome of the wear-out assessment to a user. This may, by way of non-limiting example, comprise a visual output, for example illuminating one or more lighting elements, or an acoustic output, for example an alert sound, or a tactile or haptic output such as the vibration generated by vibrator within the oral care device.

In general, the wear-out assessment may be performed during or after each operation session, or it may be performed less regularly. For example, it may be performed after every x number of operation sessions, may be performed at regular intervals of time, for example every week, or once every day, or once every two weeks.

There are a variety of different options for the sensor unit. A number of different examples will be outlined in more detail below to aid understanding of the range of possibilities encompassed by the broad inventive concept outlined above.

In a group of embodiments, the wear-out assessment can be understood as comprising detecting deviation of one or more defined characteristics of the output signal from predefined baseline characteristics. The signal characteristics may be measured outside of an operation session, thus reflecting calibration or null signal characteristics. These may drift from baseline levels over time due to wear of components.

The 'pre-defined criteria' in this case may be a threshold or minimum deviation of the defined signal characteristics from the reference or baseline characteristics.

The baseline characteristics may refer to specific set of one or more characteristics of the signal measured at a point of minimum or zero wear of the device components.

There are a range of options with regards to the sensor unit and corresponding output signal.

The different embodiments will now be outlined in more detail.

There are different options for the nature of the sensor unit 16 and the output signal 20 which is used.

According to one advantageous set of examples, the sensor unit 16 may be a physical clean-level sensor, which is adapted to detect a level of cleanliness of tooth surfaces in the mouth. It may be adapted to detect this continuously or recurrently throughout an operation session of the oral care device. Thus, in this set of examples, the oral care device may be an oral cleaning device for performing a cleaning function, e.g. for cleaning surfaces of teeth. For instance, it may be a toothbrush or a cleaning mouthpiece device (as discussed above). The operation session of the device may therefore be an oral cleaning session.

In some examples, the device components whose wear is indirectly monitored in this manner could correspond to protruding cleaning elements of the device which are adapted to be rubbed against surfaces of teeth in order to mechanically clean them. Cleaning elements may be cleaning filaments, for example bristles. It is well known that bristles undergo wear, leading to splaying of the bristles, which reduces cleaning efficiency. In general, once this performance degradation has started, it will increase steadily. Another example may include a nozzle of an oral irrigator powered flossing device. Wear of a nozzle of the device may correspond for example to build up of limescale within the nozzle, leading to a decline in cleaning efficiency.

In embodiments in which the sensor unit is a clean-level sensor, this may be a plaque detection sensor.

In some examples, the clean level sensor which is used as the sensor unit 16 may be a sensor which is used during the normal cleaning operation of the device for the purpose of detecting when the end of the cleaning session has been reached. For example, the clean level sensor can be used to detect when a threshold cleanliness has been reached, meaning that the cleaning session can be terminated, for example automatically. This may comprise for example deactivating a movement generator which is driving mechanical oscillation of cleaning elements of the device.

In accordance with one or more embodiments, the sensor unit 16 may be adapted to generate an electromagnetic (e.g. optical), acoustic or fluid emission for performing a contact or non-contact physical interaction with surfaces in an oral cavity of a user, and wherein the signal is indicative of properties of the interaction of said emission with surfaces.

The sensor unit 16 could be clean level sensor which utilizes such an emission for performing the sensing of cleanliness of oral surfaces. In other examples, the sensor unit may be signally coupled to a further functional component which generates emissions to perform a cleaning or treatment function, for example an oral irrigation device or powered flosser which generates a fluid emission for a cleaning function, or an RF treatment device which uses an RF emission to treat gums.

One example sensor unit, taking the form of a clean level sensor which uses a fluid emission to sense real-time cleaning efficacy, will now be described.

This example is illustrated schematically in FIGS. 2-6.

In this example, the sensor unit 16 is plaque detection sensor adapted to generate a fluid flow for being driven onto or over a tooth surface, and wherein the output signal is based on a fluid impinging the tooth surface and measurement of a pressure or flow of the generated fluid flow. The fluid may be air (or another gas) in some examples. When plaque is present on the surface of teeth, the teeth are stickier (surface fluid elasticity is greater). The effect of this is that when passing fluid onto or over the tooth surface, elastic absorption of the fluid pressure by the surface is higher relative to a tooth surface without the plaque, and this leads to a measurable reduction in the pressure of the fluid compared to a state in which the tooth surface is clean. Thus, this sensor can be used to sense a level of plaque on the tooth based on the pressure and/or flow characteristics of the fluid stream being passed onto or over the tooth surface. As the tooth becomes progressively cleaner (reduced plaque), the pressure progressively increases (along with a decreasing flow rate).

The fluid-based plaque sensor may comprise a tube 56 arranged to outwardly protrude from a surface of a portion of the oral care device which is received in the mouth during operation. A distal end of the tube is open 58, permitting outflow of a stream of fluid 62 from the end of the tube, for interaction with a tooth surface. The tube is arranged so that during normal operation of the oral care device in the mouth, the end of the tube is arranged to engage against tooth surfaces. For example, it may be integrated within a bristle field 66 of the device, as shown in FIG. 5, so that when the bristles are engaged against tooth surfaces for cleaning the teeth, opening 58 at the end of the tube is automatically also engaged against the tooth surface.

The end of the tube 56 may be shaped to ease the engagement of the fluid opening 58 operatively against the tooth surface. For example, FIG. 3 shows one example in which the end of the tube features a recessed channel running diametrically across a distal face of the tube, and wherein the opening 58 is located at a middle region of a base of said recessed channel. This enables an upper side of the channel to engage operatively against the tooth surface and provides for an area of fluid engagement against the tooth that is larger than the size of the opening itself, and a different shape (i.e. linear in this case). FIG. 4 shows a further example, in which the end of the tube is chamfered at two opposing sides of the tube opening 58, which provides for easier engagement of the opening 58 against the tooth surface, even if the tube is engaged against the surface from an oblique angle.

Figures 2, 3, 4, 5, 6:
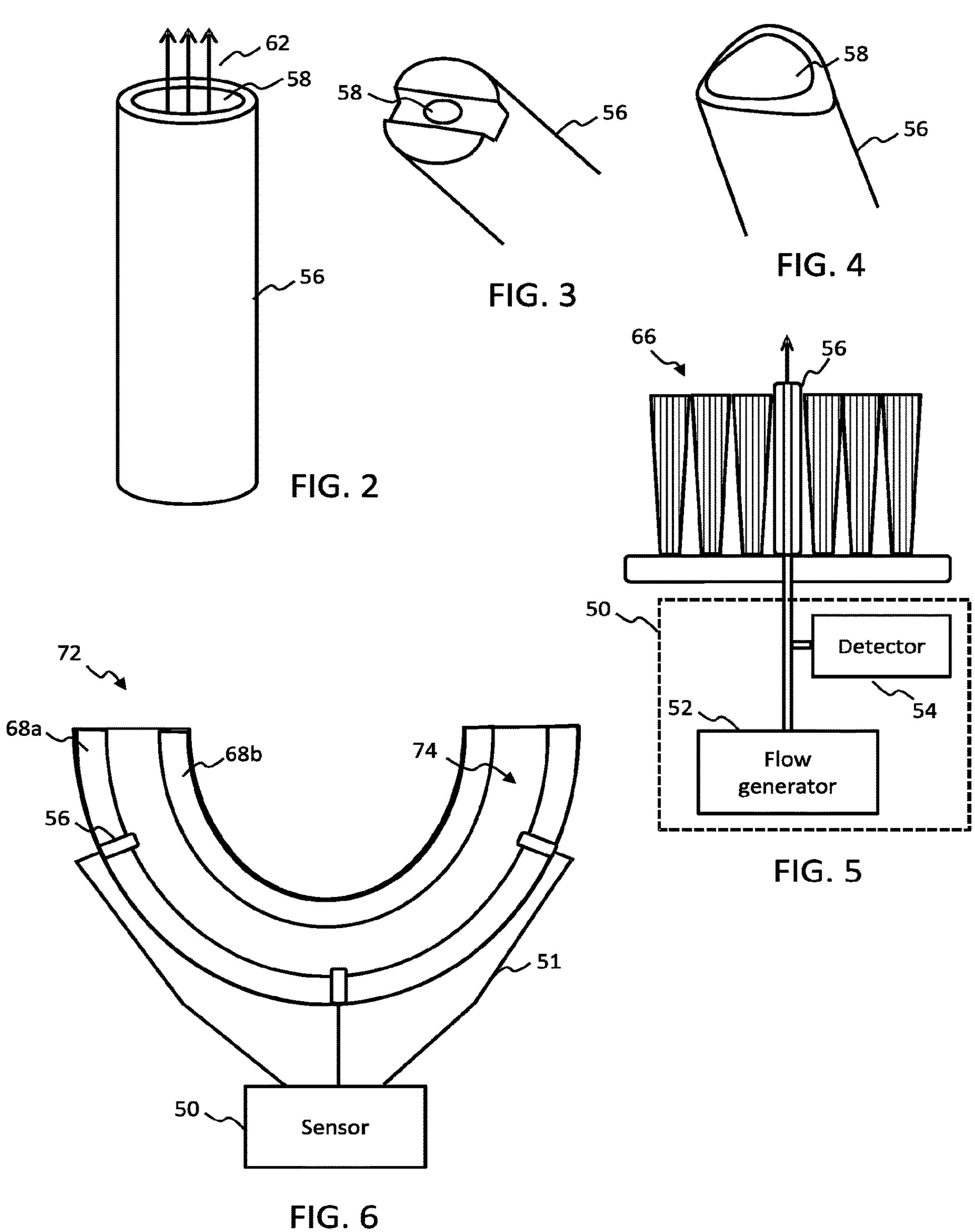
FIGS. 2-4 show examples of a tube for use in a fluid-based plaque detector.
FIG. 5 shows components of an example fluid-based plaque detector.
FIG. 6 shows an example oral care device comprising a fluid-based plaque detector, including a plurality of fluid outlet pipes.

With reference to FIG. 5, the plaque sensor in this example comprises a sensing module 50 which is fluidly coupled to the tube 56, with the tube arranged physically protruding out of the surface of the oral care device. The sensor module comprises a fluid flow generator 52 (preferably a flow generator) which is arranged to provide a pressurized fluid flow through the length of the tube toward the distal end of the tube comprising the opening 58. The sensor module further comprises a detector element 54 which is arranged to sense a pressure or flow of the fluid flowing through the tube 56. The detector may be arranged to sense the fluid flow or pressure at a location between the flow generator and a proximal end of the tube 56, for example it may sense one or both of these properties within a conduit which extends between the flow generator and the proximal end of the tube 56.

The detector 54 may generate an output signal indicative of the sensed pressure or flow. Alternatively, it may generate an output signal indicative of a level of plaque on the teeth, this determined by the detector based on the sensed pressure or flow of the fluid. The output signal from the detector may provide the input signal 20 to the processor for use in assessing wear-out.

By way of further illustration, examples of suitable fluid-based plaque detection sensors are described in detail in each of the documents: WO 2014/097240, WO 2014/097241, and WO 2014/097031.

In advantageous examples, the plaque sensor may comprise a plurality of the tubes 56, to permit a plaque level to be sensed at multiple different tooth surface locations. The plaque level could be sensed simultaneously at multiple locations, or the plurality of tubes could permit plaque level to be sensed any one or more of the locations.

One example is schematically illustrated in FIG. 6. This example depicts an oral care device in the form of a brushing mouthpiece device 72. The figure shows a plan view of the mouthpiece. The mouthpiece device comprises a U-shaped cleaning portion for being received in the oral cavity. This cleaning portion comprises upper and lower tooth receiving channels. Only the upper 74 tooth receiving channel is shown in FIG. 6. Protruding into the tooth receiving channels from opposing walls delimiting the channel are opposing rows of bristles, which form a first bristle field 68*a* and a second bristle field 68*b*. When teeth are received in the channel, the bristle fields protrude to make contact with surfaces of the teeth on both the buccal and lingual sides.

As shown, the mouthpiece includes a plaque sensing arrangement, which comprises a sensing module 50 which is fluidly coupled to a plurality of tubes 56 (in accordance with the descriptions outlined above). Fluid conduits or pipes 51 extend between the sensing module 50 and the tubes 56 to carry the fluid flow for performing the plaque sensing. The tubes are arranged at a series of different spatial locations around the tooth receiving channel to permit detecting plaque at multiple different regions of the row of teeth which is received in the mouthpiece channel in operation. The plurality of tubes 56 may be fluidly connected in parallel or in series to a flow generator 52 (not shown in FIG. 6) comprised by the sensor module 50.

The tubes 56 at the plurality of positions could be used to sense plaque at multiple positions at once. The output signal 20 received by the processor 12 may be a signal relating to an average plaque level sensed across all positions for example. Alternatively, the plaque level at just a subset of one or more of the tube 56 locations could be used to provide the signal 20.

By way of one advantageous example, the plaque sensor may be adapted to utilize plaque sensor readings from a tube 56 location at which, during one or more previous cleaning sessions, the sensed plaque level declined most slowly over the course of the cleaning session, or a location where a larger amount of plaque was sensed to be present at the end of the cleaning session than any other location. These locations may correspond to places which tend to accumulate the most plaque, or where cleaning is more awkward. This could be based on previously recorded data from previous cleaning sessions, for example stored in a local memory of the sensor or the processor 12, or the oral cleaning device. By using the particular sensing location at which plaque removal was sensed to occur more slowly or less effectively, this ensures that, when monitoring the signal 20 to detect when clean level has reached the defined threshold 32, the clean level is one which has been reached all areas of the mouth, including the area sensed as being the slowest or most difficult to clean.

In some examples, where the mouthpiece unit is a custom-made mouthpiece, the sensing locations could be configured according to locations that a dental professional knows are spots which may accumulate more plaque or may be difficult to clean.

In accordance with a further set of one or more examples, the sensor unit 16 may take the form of a clean level sensor, and wherein the clean level sensor is a plaque sensor which uses optical (or other electromagnetic) emissions to detect a plaque level. In particular, the plaque level sensor may include one or more optical sources arranged to generate an optical output for being received on tooth surfaces during use of the oral care device. The sensor unit may further include an optical (or other EM) sensing element arranged to sense a reflection of the optical (or other EM) emission back from the tooth. Based on properties of the reflected optical signal, a level of plaque can be sensed. For example, a tooth surface with a plaque covering has different optical scatter properties compared to a clean tooth surface. It may also have different fluorescence properties. These differing properties have a detectable impact on optical properties of a reflected optical signal, for a source optical signal which is fixed in respect of these properties. This thus allows a plaque level on the teeth to be sensed.

An example of an optical plaque detector suitable for use in accordance with embodiments of the invention may be found in the documents: WO 2014/097135, WO 2014/097045, or WO 2015/056197.

In advantageous examples, an oral care device may comprise a plurality of plaque sensing elements 82, each having an optical source to generate an optical emission, and an optical sensing element to sense a reflection of emission from a tooth surface. The or each plaque sensing element may be operatively coupled to an optical sensor module 80 which is adapted to generate a sensor output indicative of the relevant optical property of the reflected waves which is sensed, or indicative of a plaque level. This output signal may be used as for performing the wear-out assessment.

Figures 7, 8, 9, 10:
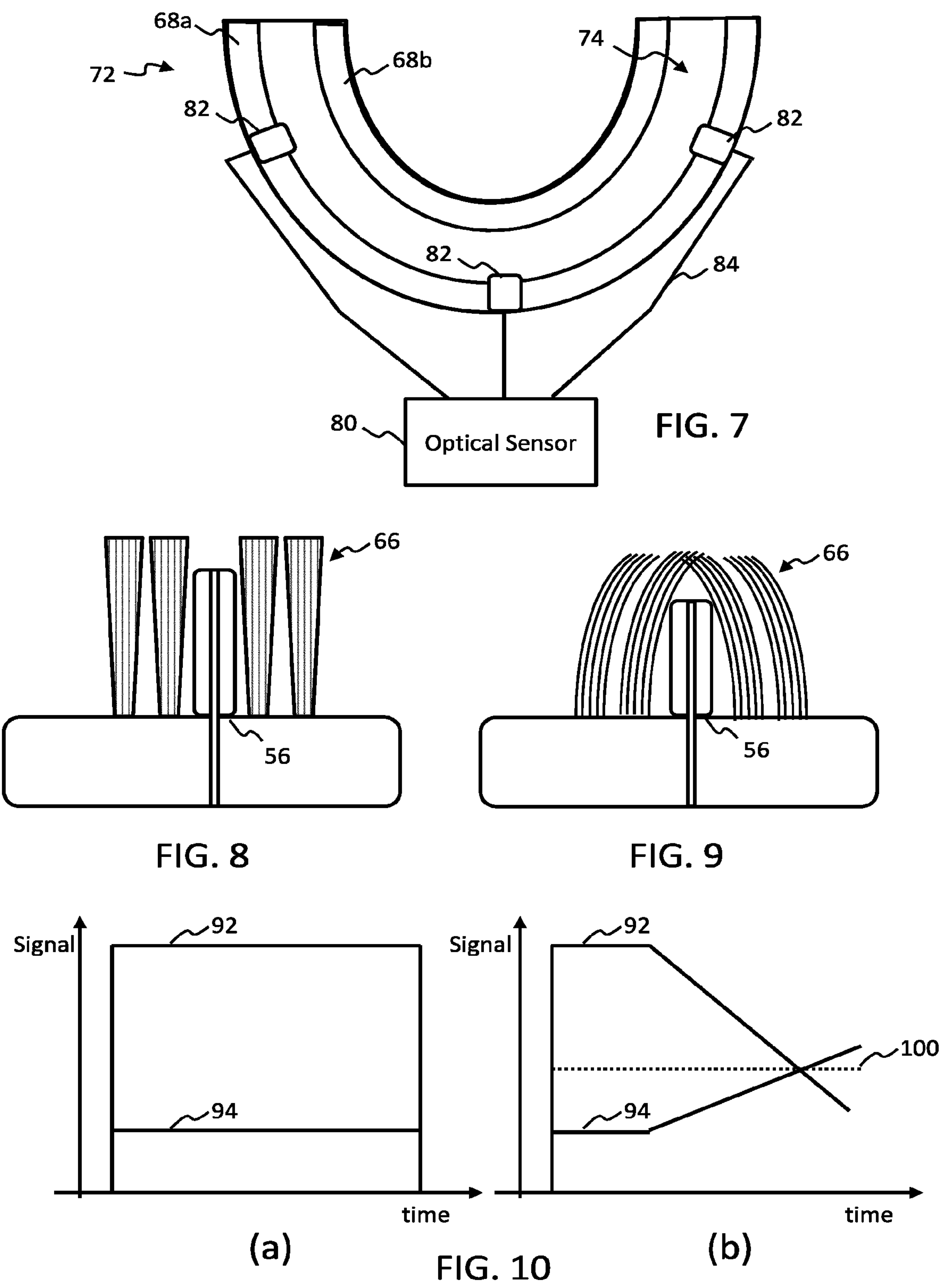
FIG. 7 shows an example oral care device comprising an optical emission based plaque sensor, the sensor comprising a plurality of optical sensing elements.
FIGS. 8-9 illustrate an example wear-detection approach in accordance with a group of embodiments, wherein interaction between a sensor unit and operative components of an oral care device is used to detect wear.
FIG. 10 illustrates example signal profiles of a sensor unit output in case of low wear and high wear states of an oral care device.

FIG. 7 illustrates one example oral care device comprising a plurality of plaque sensing elements 82, connected to an optical sensing module 80. This device is in the form of a brushing mouthpiece device 72. The components of the mouthpiece are otherwise the same as that depicted in FIG. 6 above.

The plurality of plaque sensing elements 82 are arranged at a series of different spatial locations around the tooth receiving channel 74 of the mouthpiece to permit detecting plaque at multiple different regions of the row of teeth which is received in the mouthpiece channel. The plurality of plaque sensing element 82 may be connected in parallel or in series to the optical sensing module 80. The sensing elements may be electrically connected. Alternatively, in some examples, the optical source comprised by each sensing element 82 may be optically supplied by an optical generator in the sensor module 80, and wherein the sensing elements 82 are optically coupled to the optical sensing module 80 via respective optical fibers 84.

The plaque sensing elements 82 at the plurality of positions could be used to sense plaque at multiple positions at once. The signal 20 received by the processor 12 may be a signal relating to an average plaque level sensed across all positions for example. Alternatively, the plaque level at just a subset of one or more of the sensing element 82 locations could be used to provide the signal 20. In relation to this feature, the same options as outlined above in relation to FIG. 6 can be applied. For brevity, these will not be repeated again here.

In some examples, as in the example clean-level sensors outlined above, the signal from the sensor unit may be utilized by a controller of the oral care device to trigger deactivation of active oral care components (e.g. cleaning components), thereby bringing the operation session (e.g. cleaning session) to an end. This may comprise deactivating oscillation of bristles of an oral cleaning device such as a mouthpiece device.

In further examples, the sensing unit 16 may detect a clean level of the teeth (e.g. plaque) only indirectly. It may not be adapted to use an emission, but may utilize another functional component of the oral care device.

By way of example, the oral care system may comprise a plurality of mechanical cleaning elements for mechanical engagement with surfaces in the oral cavity, and may further comprise a movement generator arranged to drive oscillatory movement of the cleaning elements during an operation session, the movement generator having a motor powered by a drive circuit. The sensor unit in this case may be signally coupled to the drive circuit, and wherein the output signal is indicative of one or more electrical characteristics of the drive circuit.

By way of a further example, the oral care device may comprise one or more cleaning elements upstanding from a surface of the oral care device arranged to be received within the oral cavity during use, and the cleaning elements arranged to mechanically engage against surfaces of teeth to perform a cleaning function. The sensor unit may comprise one or more piezoelectric elements mounted on one or more of the cleaning elements, or adjacent to one or more cleaning elements, for example in set within a bristle field of the cleaning device.

Features in accordance with a main group of embodiments will now be outlined.

The group of embodiments is based on the concept of indirectly detecting a physical degradation of certain components of the device, this leading to a change in certain signal characteristics of the sensor unit output signal, during a time when the device is not in use for the oral care or cleaning function and is outside of the oral cavity (i.e. characteristics of a null signal or calibration signal).

In particular, in accordance with one or more embodiments, the wear-out assessment performed by the processor 12 may comprise detecting deviation of one or more defined characteristics of the output signal 20 (from the sensor unit) from pre-defined baseline characteristics.

The one or more pre-defined criteria may include a threshold or minimum deviation of the defined signal characteristics from the reference or baseline characteristics.

The determining may be done outside of an operation session of the oral care device, i.e. when the oral care system is not physically interacting with dental surfaces. The signal in this case thus corresponds to a calibration signal or null signal.

The baseline characteristics may refer to specific set of one or more characteristics of the output signal measured at a point of minimum or zero wear of the device components. For example, this may be the signal characteristics, as measured in a factory (factory reference). The characteristics are chosen as ones which change progressively as a function of increasing wear of relevant oral care components, e.g. cleaning elements. As the signal characteristics or pattern deviates over time from the baseline characteristic or pattern, this provides an indication of increasing wear.

In preferred embodiments, the sensor unit may be a component adapted to generate an acoustic, optical or fluid emission (as discussed above).

By way of one example, as bristles of an oral cleaning device such as a mouthpiece cleaning device begin to splay with wear, they can physically interfere with the operation of a sensor unit. For example, bristles can splay into or away from the emission path of sensor unit which uses a fluid, optical or acoustic emission. This will change the emission interaction path and the signal characteristics of the sensor unit output signal.

By way of example, the sensor unit may be a clean level sensor, for example a plaque detection sensor. However, in other examples, it could be a sensor module coupled electrically to the control circuit of an emission-based interaction component having a different function, for example an element which generates the emission for a cleaning or treatment function, e.g. an RF cleaning emission.

In this set of examples, the output signal 20 might give an indication of interaction of the emission with cleaning elements en route to the tooth surfaces, i.e. an indication of physical interference between the emissions and the cleaning elements.

FIGS. 8-10 illustrate one example.

FIG. 8 shows a portion of an oral cleaning device for which the cleaning elements (e.g. bristles) 66 of the oral cleaning device are in a state of low or zero wear (e.g. production-new). The sensor unit 16 in this example comprises a fluid-emission based plaque sensor, comprising a tube 56 (as described in detail above). The sensor unit is arranged such that when the bristles 66 are not worn, the physical interaction between the emission generated by the sensor unit 16 and the cleaning elements is minimal. Signal characteristics related to the emission (e.g. electrical characteristics for an optical emission, or flow/pressure characteristics for a fluid emission) will have a corresponding baseline or reference pattern or value.

As the cleaning elements begin to wear, they may begin to protrude into the emission path. This is illustrated in FIG. 9. This thus leads to a change in the characteristics of the sensor unit output signal. In different examples, a flow of fluid emitted from the tube 56 may be measured by a flow sensor, or a pressure of the fluid emitted from the tube 56 may be measured by a pressure sensor. The pressure or flow may be measured at a location along the length of tube in some examples.

FIGS. 10(*a*) and 10(*b*) schematically illustrate example flow 92 and pressure 94 signals for the sensor unit 16 as a function of time over the course of a wear-out assessment testing period. FIG. 10(*a*) illustrates the signals for the case when the components of the oral care device are in a state of low wear or new. FIG. 10(*b*) illustrates the signals for a case when the components are in a state of high wear, and need replacing.

The processor 12 may be adapted to perform the wear-out assessment after each operation session, when the operation session is no longer in progress. It is preferably done when the oral care device is not received within the oral cavity of the user. The wear-out assessment may be performed less frequently, for example a regular wear-out analysis may be performed once a day or once a week or once a month (automatically, or manually triggered by the user).

When the wear-out assessment is performed, the sensor unit 16 may be activated for a predefined testing period, and the output signal from the sensor unit over the course of the testing period monitored. FIG. 10(*a*) shows flow 92 and pressure 94 signals over the course of a testing period in the case of low wear. As illustrated, the flow and pressure remain at a uniform or relatively constant level throughout the course of the testing period. These levels are in accordance with the baseline or reference levels for these characteristics. FIG. 10(*b*) shows flow 92 and pressure 94 signals in the case of higher wear. As shown, the signals over the course of the testing period deviate from the baseline levels, with the flow decreasing and the pressure increasing as a consequence of the cleaning elements impinging on the flow path from the tube 56. For instance, splayed bristles interfere or even completely interrupt the fluid flow, causing a fluid backpressure (increased pressure) or reduced fluid stream due to bristles interfering with the air stream path. In another embodiment or configuration, changes in the fluid emission path characteristics could result in a pressure decrease and flow rate increase (for example bristles may bend away from the emission path). The deviation in the illustrated example exceeds a pre-defined deviation threshold 100.

Thus, in this example, the change in the fluid flow/pressure signature pattern (profile) through the bristle field 66 can be used as an indicator of device wear.

The wear-out assessment may comprise assessing the relevant signal characteristic as measured in a single testing session, or as measured over multiple testing sessions, for example spanning multiple days. For example, an average or other statistical property of the relevant signal characteristic may be calculated with respect to values acquired over a predefined period of time, such as a week or month. The deviation of this average value or statistical property from the predefined baseline may be determined in order to perform the wear-out assessment.

Thus, in this set of examples, the wear out assessment is based on assessing a property of interaction between oral care components of the device (e.g. cleaning elements) and the sensor unit 16.

Although the example illustrated in FIGS. 8-9, the wear is detected based on an interaction between the cleaning elements and the sensor unit, this represents just one possible example. For instance, according to one or more embodiments, the detected deviation in the characteristics of the sensor unit signal 20 may be caused for instance by degradation of the sensor unit itself over time. One example includes for instance damage to a tip of the tube 56 of a fluid-based plaque sensor. Another example may include damage to an optical output face of an optical sensing element 82. Another example may include mechanical wear-out of a movement generator (where one is included), this being detected based on observable drift in one or more signal characteristics of the drive circuit from baseline levels of the one or more signal characteristics.

By way of one further example, the sensor unit 16 may be an optical emission-based sensor unit such as an optical plaque detection sensor. Here, changes in light reflection, absorption or scattering patterns over a single testing session or over multiple testing sessions may be monitored, and deviation of one or more of these properties from a baseline or reference level may be used to indicate wear-out. The light reflection, absorption, or scattering patterns may vary due to degradation in the optical components themselves, or due to splaying of the bristle field leading to physical interference with the optical output path. If bristles or tufts are splayed, the light path can be interrupted or disturbed for example. The light reflection, absorption, or scattering patterns are measured using electrical characteristics of an output signal from the optical sensing elements.

In another example, the sensor unit 16 may be a sensor module arranged to sense signal characteristics of the drive circuit of a movement generator of the oral care system (as described above). Here, splaying of cleaning elements may result in a change in the moment of inertia of the cleaning unit, and this will typically be reflected in changes in one or more signal characteristics of the drive circuit. Thus, the sensor unit may be adapted to detect the relevant signal characteristics, and wherein wear-out of the cleaning elements is detected based on these deviating from reference or baseline levels by a threshold amount.

In accordance with one or more embodiments, the oral care system may comprise an oral care device including at least a portion for being received in an oral cavity of a user, wherein the oral care device comprises the sensor unit.

The processor of the oral care system may be comprised by the oral care device, so that the two form a single unit. Alternatively, the processor may be external to the oral care device, for example it may be a processor of a mobile computing device belonging to the user, and adapted to operatively communicate with the oral care device.

In accordance with one or more embodiments, the oral care device may comprise a mouthpiece unit for being received in the oral cavity of a user.

The mouthpiece unit may be U-shaped and may include upper and lower tooth-receiving channels, with a biting surface disposed between the two channels, forming a base for each of the channels. It may alternatively be a J-shaped partial mouthpiece unit in further examples.

The mouthpiece unit may comprise a plurality of cleaning elements for rubbing against tooth surfaces during an operation session. The cleaning elements may comprise cleaning filaments. The cleaning elements may be bristles or bristle bundles.

The oral care device may include a movement generator for driving oscillatory movement of the bristles over the tooth surfaces.

Examples in accordance with a further aspect of the invention provide a method for detecting wear-out in an oral care device. The method comprises: receiving an output signal from a sensor unit, the sensor unit adapted in use to generate an output signal related to a cleaning efficacy of an oral cleaning function of the system. The method further comprises determining one or more pre-defined characteristics of the signal. The method further comprises performing a wear-out assessment comprising determining whether the one or more signal characteristics meet one or more pre-defined criteria, and generating a wear-out feedback signal dependent upon an outcome of the assessment.

Examples in accordance with a further aspect of the invention provide a computer program product comprising computer program code, the computer program code being executable on a processor, and the code configured to cause the processor to perform a method in accordance with any example or embodiment outlined above or described below, or in accordance with any claim of this application.

Embodiments of the invention described above employ a processor. The processor can be implemented in numerous ways, with software and/or hardware, to perform the various functions required. A processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. Measures recited in mutually different dependent claims can be advantageously combined. A computer program may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. An oral care system comprising:

means for performing an oral cleaning;

a sensor unit adapted to generate a sensor signal related to a cleanliness level when the means for performing an oral cleaning are inside an oral cavity of a user; and a processor arranged to perform a wear-out assessment comprising monitoring the sensor signal generated when the means for performing an oral cleaning are outside the oral cavity, to generate a wear-out feedback signal dependent upon an outcome of the wear-out assessment, wherein the sensor unit is adapted to generate an electromagnetic, acoustic or fluid emission for performing a contact or non-contact physical interaction with surfaces in an oral cavity of a user, and wherein the sensor signal is dependent upon properties of the interaction of said emission with surfaces in the oral cavity.

2. The system as claimed in claim 1, wherein the wear-out assessment comprises:

retrieving from a memory one or more baseline measures of the one or more pre-defined characteristics of the sensor signal when the oral cleaning means are outside the oral cavity;

detecting deviation of the determined characteristics of the sensor signal from the baseline measures of the characteristics of the sensor signal.

3. The oral care system as claimed in claim 1, wherein the sensor unit comprises a plaque-detection sensor.

4. The oral care system) as claimed in claim 3, wherein the plaque detection sensor is adapted to generate a fluid flow for being driven onto or over a tooth surface, and wherein the sensor signal is based on measurement of a pressure or flow of the generated fluid flow.

5. An oral care system comprising:

means for performing an oral cleaning;

a sensor unit adapted to generate a sensor signal related to a cleanliness level of oral surfaces when the means for performing an oral cleaning are inside an oral cavity of a user; and a processor arranged to perform a wear-out assessment comprising monitoring the sensor signal generated outside of an operation session of the oral care system, to generate a wear-out feedback signal dependent upon an outcome of the wear-out assessment, the wear-out feedback signal being a sensory output signal for controlling a sensory output device to generate sensory stimulus for communicating the outcome of the wear-out assessment to a user.

6. The system as claimed in claim 5, wherein the wear-out assessment comprises:

retrieving from a memory one or more baseline measures of the one or more pre-defined characteristics of the sensor signal outside of an operation session of the oral care system;

detecting deviation of the determined characteristics of the sensor signal from the baseline measures of the characteristics of the sensor signal.

7. The oral care system as claimed in claim 5, wherein the sensor unit is adapted to generate an electromagnetic, acoustic or fluid emission for performing a contact or non-contact physical interaction with surfaces in an oral cavity of a user, and wherein the sensor signal is dependent upon properties of the interaction of said emission with surfaces in the oral cavity.

8. The oral care system as claimed in claim 5, wherein the sensor unit comprises a plaque-detection sensor.

9. The oral care system as claimed in claim 8, wherein the plaque detection sensor is adapted to generate a fluid flow for being driven onto or over a tooth surface, and wherein the sensor signal is based on measurement of a pressure or flow of the generated fluid flow.

10. A computer-implemented method for detecting wear-out in an oral care system, the method comprising:

receiving a sensor signal from a sensor unit, the sensor signal relating to a cleanliness level of oral surfaces when the sensor signal is generated when oral cleaning means of the oral care system are inside an oral cavity of a user;

performing a wear-out assessment comprising monitoring the sensor signal generated outside of an operation session of the oral care system; and generating a wear-out feedback signal dependent upon an outcome of the wear-out assessment, the wear-out feedback signal being a sensory output signal for controlling a sensory output device to generate sensory stimulus for communicating the outcome of the wear-out assessment to a user.

* * * * *